Patented Apr. 18, 1950

2,504,388

UNITED STATES PATENT OFFICE 2,504,388

ORGANOPOLYSILOXANE COMPOSITIONS

Orville A. Braley, Midland, Mich., assignor to Dow Corning Corporation, Midland, Mich., a corporation of Michigan No Drawing. Application June 11, 1949, Serial No. 98,620

6 Claims. (Cl. 154—128)

This invention relates to catalytic polymerization of organosiloxanes and to the compositions so polymerized.

One of the important uses for siloxane resins is in the preparation of laminates. A particularly useful form of these laminates comprises layers of inorganic fabric impregnated and bonded together with a siloxane resin. In order for the siloxane to be applicable for this use, it must possess certain characteristics.

The necessary requirements are that the resin set to a tough, flexible, tack-free condition in a short time. The resin must not flow during molding to such an extent that it will run out of the laminate. The resin must retain sufficient thermoplasticity so that the layers will be bonded together during molding.

Not all siloxane resins or all catalysts for polymerizing siloxanes and not all combinations of siloxanes and catalysts meet these requirements.

It is an object of this invention to provide siloxane-resin compositions which are suitable for use in the production of laminates. Another object is to provide a catalyst which will produce superior laminates and molding compositions. Other objects and advantages will be apparent from the following description.

This invention relates to a composition of matter comprising an organosiloxane having an average of from 1 to 1.5 organic radicals per silicon atom said radicals being methyl and phenyl, from 0.01 percent to 0.1 percent lead 2-ethyl hexoate and from 0.5 percent to 1.0 percent dibutyl tin diacetate, said percentages being based on the weight of the siloxane.

The siloxane resins employed in this invention are known in the art as are their methods of preparation. The resins employed herein are copolymers of phenyl and methyl siloxane which may be composed essentially of combinations of the following siloxane units:

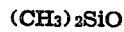

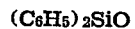

In addition to these principal ingredients the copolymers may contain up to about 10 mol percent siloxane units of the type $R_3SiO_{1/2}$ and $SiO_2$ where R is methyl or phenyl. The copolymers contain both methyl and phenyl radicals and it is preferred that at least 10 percent of the total number of organic radicals be one of the above type, the remainder being the other.

The siloxanes are polymerized by mixing them with the catalysts and thereafter heating the mixture at a temperature above 60° C. Under such conditions the resin sets to a tough, flexible, tack-free condition within a few minutes. If desired, a solvent such as aromatic and aliphatic hydrocarbons, ethers, ketones and aliphatic alcohols may be employed to facilitate solution of the catalysts in the resin.

The combination of lead 2-ethyl hexoate and dibutyl tin diacetate when employed as catalysts for the polymerization of siloxanes, produces results which are not obtainable with either salt alone and which as far as is known, is not obtainable with any other siloxane polymerization catalyst or combination of other catalysts. The siloxane resins which are polymerized with the combination of lead 2-ethyl hexoate and dibutyl tin diacetate possess a combination of flexibility, toughness and superior moldability which make them eminently useful for laminates and molding powders.

Laminates which are prepared by bonding together inorganic fabrics with the resin compositions of this invention may be bent around a 1/4" mandrel at a temperature of 25° C. without undue loss of dielectric strength. In addition, the laminates may be hot pressed into acute angle shapes and will retain those shapes after cooling and removal from the press. Articles so prepared are suitable for use in electrical equipment.

The combination of siloxanes and catalysts of this invention produce superior molding compositions. These compositions may be prepared by mixing the resin and catalysts together with a heat resistant inorganic filler, and heating the mixture to advance the resin to a tack-free state. The composition may then be molded into any desired shape at a temperature above 100° C. under a pressure of from 4000 p. s. i. to 15,000 p. s. i.

If desired, the siloxane may be dissolved in a solvent before addition of the catalysts and filler. The use of solvent facilitates solution of the catalyst and handling of the mixture. After mixing, the solvent may be removed at room temperature and the residue heated at about 100° C. to obtain a tack-free resin. The composition may be thereafter molded as shown above.

Articles prepared from the molding composition possess superior flexual and impact strength and have heat distortion points as high as 500° C. These materials are useful in electrical apparatus and in applications requiring high heat resistance.

In order that this invention may be better understood, recourse may be had to the following examples which are illustrative only.

*Example 1*

A toluene solution containing 45 percent by weight of a polysiloxane was prepared.

The polysiloxane had the composition 33⅓ mol percent monomethyl siloxane, 33⅓ mol percent monophenyl siloxane and 33⅓ mol percent phenylmethylsiloxane. To the solution was added 0.5 percent by weight dibutyl tin diacetate and 0.03 percent by weight lead 1-ethyl hexoate. The percents of the salts were based upon the weight of the siloxane. Pieces of glass fabric were dipped into the solution, removed therefrom, and allowed to dry at room temperature. The impregnated fabric was then heated 10 minutes at 110° C. whereupon the resin set to a tack-free condition. Two pieces of the glass fabric were laminated and then heated in a press at 175° C. under a pressure of 750 p. s. i. for 5 minutes. The resulting laminate was tough and flexible. The laminate was bent around a ¼" mandrel and the dielectric strength of the bent material was 200 volts per mil.

*Example 2*

A molding composition was prepared having the following composition: 35 percent by weight of the siloxane resin of Example 1, 0.5 percent by weight dibutyl tin diacetate, 0.1 percent by weight lead 2-ethyl hexoate, 19 percent by weight diatomaceous earth, 1 percent calcium stearate and 45 percent glass fibers.

The composition was made by preparing a toluene solution containing 60 percent by weight of the siloxane and thereafter adding to the solution the other ingredients. The solvent was removed at room temperature and the residue heated at 100° C. for 10 minutes. The resulting material was molded into bars ½ by ½ by 5" by heating the composition in a mold at 175° C. under 4000 to 8000 p. s. i. The bars were then removed from the mold and cured in an oven 16 hours at 90° C., 2 hours each at 150° C., 175° C. and 200° C. The bars were then tested and found to have a tensile strength of 4000 to 6000 p. s. i., a flexual strength at 25° C. of 8000 to 10,000 p. s. i. and at 150° C. of 5000 to 6000 p. s. i., an impact strength at 25° C. of 7 foot pounds per inch and at 150° C. of 5 foot pounds per inch and a heat distortion greater than 300° C. All of the above tests were determined by standard ASTM procedure.

That which is claimed is:

1. A composition of matter composed essentially of a siloxane resin having on the average from 1 to 1.5 organic radicals per silicon atom said radicals being selected from the group consisting of methyl and phenyl radicals, from 0.01 percent to 0.1 percent by weight lead 2-ethyl hexoate based on the weight of the siloxane, and from 0.5 percent to 1.0 percent by weight dibutyl tin diacetate based on the weight of the siloxane.

2. A composition of matter in accordance with claim 1 wherein the siloxane resin has the composition 33⅓ mol percent monomethylsiloxane, 33⅓ mol percent monophenylsiloxane and 33⅓ mol percent phenylmethylsiloxane.

3. A molding composition comprising an organopolysiloxane having on an average of from 1 to 1.5 organic radicals per silicon atom said radicals being selected from the group consisting of methyl and phenyl radicals, a heat resistant inorganic filler and from 0.01 percent to 0.1 percent by weight based upon the weight of the siloxane of lead 2-ethyl hexoate and from 0.5 percent to 1.0 percent by weight based upon the weight of the siloxane of dibutyl tin diacetate.

4. A molding composition in accordance with claim 3 wherein the composition of the organosiloxane is 33⅓ mol percent monomethylsiloxane, 33⅓ mol percent monophenylsiloxane and 33⅓ mol percent phenylmethylsiloxane.

5. A laminate comprising a plurality of layers of glass fabric bonded and impregnated with an organopolysiloxane having on an average of from 1 to 1.5 organic radicals per silicon atom, said radicals being selected from the group consisting of methyl and phenyl radicals, and from 0.01 to 0.1 per cent by weight based upon the weight of the siloxane of lead 2-ethyl hexoate and from 0.5 percent to 1.0 percent by weight based upon the weight of the siloxane of dibutyl tin diacetate.

6. A laminate in accordance with claim 5, wherein the composition of the organosiloxane is 33⅓ mol percent monomethylsiloxane, 33⅓ mol percent monophenylsiloxane, and 33⅓ mol percent phenylmethylsiloxane.

ORVILLE A. BRALEY.

No references cited.